Jan. 3, 1928.
C. J. SPENCER
STAFF HALTER
Filed Jan. 28, 1927
1,655,343
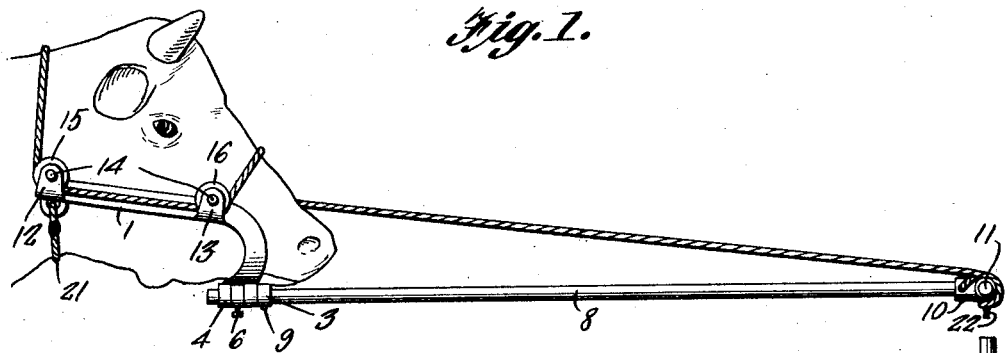
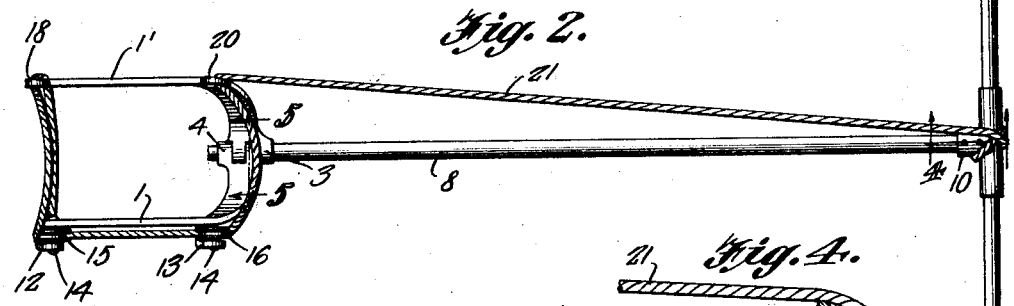
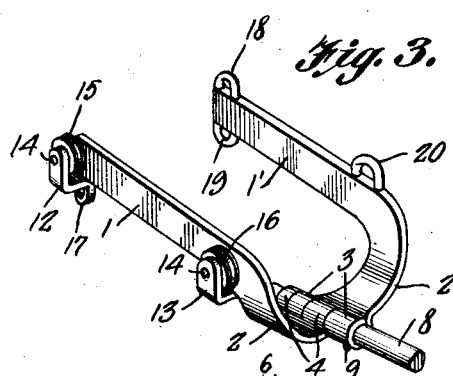
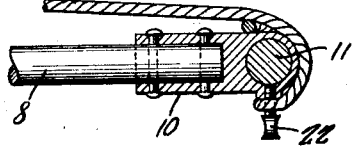
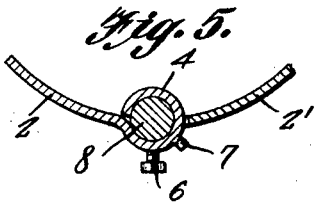
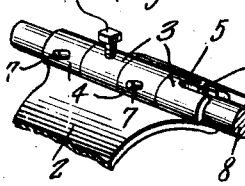
Corte Judson Spencer,
INVENTOR
BY *Victor J. Evans*
ATTORNEY
WITNESS:

Patented Jan. 3, 1928.

1,655,343

UNITED STATES PATENT OFFICE.

CORTE JUDSON SPENCER, OF DUNDEE, NEW YORK.

STAFF HALTER.

Application filed January 28, 1927. Serial No. 164,331.

My present invention has reference to a controlling device for animals which I shall term a staff halter.

An object is the provision of a device for controlling cattle for dehorning or other operations about the head in a manner whereby the neck of the animal may be twisted and the head held in desired positions with respect to the convenience of the veterinary surgeon.

A further object is the provision of a staff that embodies a comparatively simple construction which may be easily positioned on the head of the animal for firm engagement therewith and whereby a turning of the device will cause the twisting of the neck of the animal to arrange one of the animal's horns in a perpendicular position so that dehorner shears can be operated horizontally even when the animal is in its manger, with the result that the dehorning may be accomplished in a quicker manner than is ordinary, and likewise in a more humane manner inasmuch as the quickness in which the horn is removed lessens the pain of the animal.

A further object is the provision of a device for this purpose which may be conveniently secured on the head and neck portions of varying sizes of animals and wherein the parts constituting the improvement are separable so that the same can be readily cleaned or folded into a small package when not required for use.

To the attainment of the above broadly stated objects and others which will present themselves as the nature of the invention is better understood, the improvement also resides in further novel features of construction, combination and operative association of parts, a satisfactory embodiment of which is disclosed by the accompanying drawings.

In the drawings:

Figure 1 is a side elevation of my improvement in applied position.

Figure 2 is a top plan view thereof.

Figure 3 is a perspective view looking toward the jaws of the improvement.

Figure 4 is a detail sectional view approximately on the line 4—4 of Figure 2.

Figure 5 is a transverse sectional view approximately on the line 5—5 of Figure 2.

Figure 6 is a detail perspective view to more clearly illustrate the joint between the jaws.

The halter portion of my device includes a pair of members, each of which includes a straight arm 1—1'. The arms have one of their ends curved downwardly and outwardly, as at 2—2', and these curved ends provide what I will term jaws. The jaws 2 and 2' have their ends formed with spaced knuckles 3—3 and 4—4. One of the end knuckles 3 of the jaw 2 is notched, as at 5, the second knuckle of the said jaw 2 being provided with a threaded opening through which is screwed a binding bolt 6. The knuckles 4 of the jaw 2' have their sides formed with outstanding lugs 7, and these lugs are designed to contact with the under face of the jaw 2 for limiting the swinging of the jaws to open position. By this arrangement the jaws constituting the halter may be arranged on animals of different sizes.

The numeral 8 designates the staff of the improvement. This staff may be of wood, and one of its ends passes through the aligning knuckles 3 and 4 and provides a pintle for such knuckles. On the staff 8 there is a lug 9 that enters the notch 5 and the binding screw 6 is designed for frictional engagement with the staff for holding the end thereof in the knuckles. The outer end of the staff has fixedly secured thereon a T-coupling 10, and passing through the longitudinal branch of this coupling there is a rod or handle 11.

On the sides of the arm 1, there are preferably integral brackets 12 and 13. These brackets are arranged adjacent to the ends of the said arm, and passing through the brackets and received in the arm 1 there are short shafts 14 on which are journaled grooved wheels 15 and 16, respectively. The arm 1, below the bracket 14, has an eye extension 17. The outer end of the arm 1' has both its upper and lower edges provided with eye members 18 and 19, respectively, and the upper edge of the said member, adjacent to the jaw 2', is provided with another eye 20. Fixedly secured in the eye 17 there is a rope 21. This cable is trained first through the eye 19, then through the eye 18, and from thence beneath the grooved wheels 15 and 16, and directed through the eye 20. By reference to Figure 1 of the drawings it will be seen that by this arrangement the rope is arranged around the neck and the front of the upper jaw of the animal. The numeral 22 designates a binding screw that holds the handle 11 in the coupling 10. The rope 21 is brought around the back of the handle, from thence around the binding screw 22, thence back upwardly and through the part of the rope that contacts with the handle. In this manner the rope is self-holding, and also it will be seen that the binding screw 22 not only serves for holding the handle in the coupling 10 but also as a means for holding the rope or cable. The jaws 2 and 2' receive the under jaw of the animal therein, as clearly disclosed in Fig. 1 of the drawings, the arms 1 and 1' being disposed along the sides of the animal's face. When the cable is drawn taut, as above stated, the handle 11 may be turned to twist the animal's neck so that one side of the face of the animal will be sustained uppermost either for treatment or dehorning. When the animal is to be dehorned, the shears can be applied in a horizontal direction and thus conveniently operated by the veterinarian. The pin 9 entering the notch 5 in the knuckle 3, together with the binding screw 6 affords a firm engagement between the staff 8 and the jaw or halter portion of the improvement, and when the device is not required for use the screw or bolt 6 may be released from engagement with the staff 8, which permits of the withdrawal of the staff through the knuckles 3 and 4 and the separation of the jaw members of the improvement. This permits the several parts of the improvement being readily cleaned and likewise stored to produce a small package when not required for use. Of course, the handle 11 may be removed from the coupling 10 by unscrewing the binding nut 22.

In practice, should it be found desirable to cheapen the construction the jaws may be constructed to provide stationary objects.

The simplicity and advantages of my construction will be perfectly apparent to those skilled in the art to which such invention relates, when the foregoing description has been carefully read in connection with the accompanying drawings so that a further detail description will not be required. It is, of course, to be understood that I do not wish to be restricted to the precise details of construction herein set forth and may make such changes therefrom as fairly fall within the scope of what I claim.

Having described the invention, I claim—

1. A device for the purpose set forth, comprising two hingedly connected jaw members which merge into parallel arms, a staff providing a pivot for the jaws, an angle handle on the outer end of the staff, a flexible element fixed to the outer end of one of the arms, guide means on the end of the second arm through which the flexible element is trained, grooved rollers on the arms of the first mentioned jaw, a second guide on the second mentioned arm for the flexible element, and said element designed to have its end wound around and secured to the handle.

2. A device for the purpose set forth, a halter including parallel metal arms having one of their ends rounded and merging into spaced interengaging knuckles, a staff having one end passed through the knuckles and providing a pivot for the jaws, interengaging means between the staff and one of the knuckles of one of the jaws, binding means carried by the second knuckle of the said jaw engaging the staff, outstanding lugs on the knuckles of the second jaw for limiting the outward swinging of both jaws, a removable angle handle on the outer end of the staff, a pair of spaced brackets on one of the arms, grooved wheels journaled in the brackets, inner upper and lower eyes on the second arm, a cable fixed to the first mentioned arm below the outer bracket, trained through the last mentioned lower eye and through the upper eye at the end of the second mentioned arm, and from thence trained through both of the grooved wheels on the first mentioned arm and thereafter trained through the inner eye on the second mentioned arm, and having its end wound around and connected to the handle.

3. A device for the purpose set forth, two metal members having one of their ends rounded toward each other and pivotally connected and designed to be arranged against the sides of a face of an animal, a staff providing the pivot for the members, a handle for the staff and a rope secured to one of the members, arranged around the neck of the animal, trained through both of the members and secured to the handle.

4. A device for the purpose set forth, comprising two jaw members, comprising each a plate, that has its outer end rounded downwardly and formed with knuckles which interengage one with the other, a staff providing a pivot for the knuckles, means binding the staff to one of the knuckles, means limiting the swinging of the jaws outwardly on the staff, a handle passing freely through the outer end of the staff, a binding element for holding the handle on the staff, said jaws designed to be arranged against the sides of the face of an animal and the rounded ends thereof adapted to be arranged beneath the mouth of the animal, a rope having one end secured to one of the jaws, trained around the under portion of the neck of the animal and from thence over the top of the neck of the animal and likewise trained around the first mentioned jaw and through the last mentioned jaw and said rope having its end wound around the handle and the binding element between the staff and handle.

In testimony whereof I affix my signature.

C. JUDSON SPENCER.